United States Patent
Dupouy et al.

(10) Patent No.: US 12,215,059 B2
(45) Date of Patent: Feb. 4, 2025

(54) ACTIVATION OF GROUND GRANULATED BLAST FURNACE SLAG

(71) Applicant: SIKA TECHNOLOGY AG, Baar (CH)

(72) Inventors: Lissa Dupouy, Issy-les-Moulineaux (FR); Maxime Liard, Zürich (CH); Lolita Hauguel, Zürich (CH); Didier Lootens, Küsnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 208 days.

(21) Appl. No.: 17/281,153

(22) PCT Filed: Oct. 1, 2019

(86) PCT No.: PCT/EP2019/076513
§ 371 (c)(1),
(2) Date: Mar. 29, 2021

(87) PCT Pub. No.: WO2020/070093
PCT Pub. Date: Apr. 9, 2020

(65) Prior Publication Data
US 2021/0340065 A1    Nov. 4, 2021

(30) Foreign Application Priority Data
Oct. 2, 2018 (EP) .................................. 18198197

(51) Int. Cl.
| | |
|---|---|
| C04B 22/06 | (2006.01) |
| C04B 7/02 | (2006.01) |
| C04B 22/10 | (2006.01) |
| C04B 22/14 | (2006.01) |
| C04B 28/08 | (2006.01) |
| C04B 103/12 | (2006.01) |
| C04B 103/14 | (2006.01) |
| C04B 103/32 | (2006.01) |

(52) U.S. Cl.
CPC ................ *C04B 28/08* (2013.01); *C04B 7/02* (2013.01); *C04B 22/064* (2013.01); *C04B 22/10* (2013.01); *C04B 22/106* (2013.01); *C04B 22/143* (2013.01); *C04B 22/147* (2013.01); *C04B 2103/12* (2013.01); *C04B 2103/14* (2013.01); *C04B 2103/32* (2013.01)

(58) Field of Classification Search
None
See application file for complete search history.

(56) References Cited

U.S. PATENT DOCUMENTS

| | | | |
|---|---|---|---|
| 5,026,215 A | 6/1991 | Clarke | |
| 5,411,092 A | 5/1995 | Cowan | |
| 2011/0269875 A1 | 11/2011 | Nicoleau et al. | |
| 2012/0216721 A1* | 8/2012 | Hesselbarth | .......... C04B 7/1535 |
| | | | 106/695 |
| 2013/0059099 A1* | 3/2013 | Song | ..................... C04B 28/021 |
| | | | 428/34.4 |
| 2017/0362123 A1 | 12/2017 | Yammine et al. | |

FOREIGN PATENT DOCUMENTS

| | | |
|---|---|---|
| CN | 102216234 A | 10/2011 |
| CN | 102666423 A | 9/2012 |
| CN | 103819113 A | 5/2014 |
| CO | 2017002973 A1 | 9/2018 |
| EP | 2 514 727 A2 | 10/2012 |
| JP | H04-189903 A | 7/1992 |
| JP | H11116316 A * | 4/1994 |
| JP | H11-21160 A | 1/1999 |
| KR | 10-2009-0070404 A | 7/2009 |
| KR | 10-1581905 B1 | 1/2016 |
| KR | 101746220 B1 * | 6/2017 |
| WO | 2015/150319 A1 | 10/2015 |
| WO | 2017/162698 A1 | 9/2017 |

OTHER PUBLICATIONS

KR-101746220-B1, machine translation (Year: 2017).*
JPH11116316 (A), machine translation (Year: 1999).*
Safety Data Sheet (SDS): Gypsum [retrieved from the internet at Nov. 2, 2023 from <URL: https://mcdn.martinmarietta.com/assets/safety-data-sheets/gypsum-sds-june-2018.pdf>] (Year: 2018).*
Nov. 15, 2019 International Search Report issued in International Patent Application No. PCT/EP2019/076513.
Mar. 23, 2021 International Preliminary Report on Patentability issued in International Patent Application No. PCT/EP2019/076513.

* cited by examiner

*Primary Examiner* — Anthony J Green
*Assistant Examiner* — Marites A Guino-O Uzzle
(74) *Attorney, Agent, or Firm* — Oliff PLC

(57) ABSTRACT

An improved mineral binder composition including: a mineral binder including at least 30 weight-% slag, based on the weight of the mineral binder, an activator for the hydration of the slag consisting of or comprising calcium hydroxide and a co-activator consisting of or including at least one salt selected from the group consisting of lithium carbonate, lithium sulfate and sodium carbonate.

9 Claims, No Drawings

ACTIVATION OF GROUND GRANULATED BLAST FURNACE SLAG

TECHNICAL FIELD

The present invention relates to an improved mineral binder composition comprising slag.

BACKGROUND OF THE INVENTION

Portland cement is the most used mineral binder in construction industry. The production of Portland cement clinker, however, is responsible for high emissions of $CO_2$ because of the burning process of combustibles and also from the decarboxylation process of calcium carbonate.

Therefore, alternative materials which can be produced at lower temperature and with less calcium carbonate are increasingly used. Ground granulated blast furnace slag (GGBS) is one of these materials. It can substitute partly or entirely Portland cement as mineral binder in concrete or mortar, achieving similar mechanical properties but with improved chemical resistance, lower cost and better sustainability. However, slag is a latent hydraulic material, meaning that it needs activation to start the hydration. Additionally, the hydration is typically slow. In blends with Portland cement, addition of an activator for the hydration of slag is not necessary. However, the setting time in such blends is typically long and the hydration reaction slow. NaOH is often used to activate the hydration of slag. However, NaOH is highly caustic and may cause severe damage if in contact with skin, eyes or mucous membranes. Additionally, in dry mineral binder compositions comprising NaOH, dangerous dust may form when the dry composition is produced and when it is mixed with water.

Therefore, a less harmful activator is needed to increase the use of slag in construction industry.

U.S. Pat. No. 5,411,092 describes a method for cementing oil and gas wells with a composition comprising water, blast furnace slag with a particle size of 2000 to 15000 $cm^2/g$, and an activator comprising trisodium phosphate. Additional activators described are oxalate or citrate ions. The activator may further be combined with a retarder.

U.S. Pat. No. 5,026,215 discloses a method of grouting formations by a composition comprising water, microfine slag with a specific surface of a least 9'500 $cm^2/g$, a dispersant and an accelerator and the ratio of water to slag is 0.5:1 to 10:1. The activator preferably comprises an alkali or alkaline earth oxide, hydroxide or salt. The preferred activator is NaOH.

US 2017/0362123 discloses a hydraulic binder comprising a solid mineral compound such as blast furnace slag, fly ash or glass powder, and an activation system that comprises at least 30 weight-% of a phosphoric acid-derived salt. There is still the demand for an improved mineral binder composition comprising slag with reduced setting time and faster strength development.

SUMMARY OF THE INVENTION

The subject of the invention is to provide a cost-effective and environmentally friendly mineral binder composition that comprises slag and shows fast setting and improved early strength.

It was surprisingly found that this task could be fulfilled by a mineral binder composition as described in claim 1.

The mineral binder comprises at least 30 weight-% of slag, which is very desirable for environmental reasons. Such high amount of cement replacement reduces the amount of produced $CO_2$ effectively.

The activator consisting of or comprising calcium hydroxide, is highly effective even at low dosage. Calcium hydroxide is less corrosive than NaOH, often used to activate slag, and it is cheap.

The co-activator, in combination with calcium hydroxide, very effectively further reduces the setting time and increases the early strength of the slag comprising mineral binder composition.

DETAILED DESCRIPTION OF THE INVENTION

The present invention refers to a mineral binder composition comprising
- a mineral binder comprising at least 30 weight-% slag, based on the weight of the mineral binder,
- an activator for the hydration of the slag consisting of or comprising calcium hydroxide and
- a co-activator consisting of or comprising at least one salt selected from the group consisting of lithium carbonate, lithium sulfate and sodium carbonate.

In the present document, the term "mineral binder" refers to an inorganic binder that reacts with water in a hydration reaction and forms solid hydrates. This may be, for example, a hydraulic binder (e.g., cement), a latent hydraulic binder (e.g., slag), a pozzolanic binder (e.g., fly ash), or a non-hydraulic binder. Calcium sulfate, and especially calcium sulfate hemihydrate, is considered to be a mineral binder within the present context. However, the weight of the mineral binder is calculated without calcium sulfate, especially calcium sulfate hemihydrate, throughout the present invention. In other words, the weight of optionally present calcium sulfate, especially calcium sulfate hemihydrate, is omitted for the calculation of the weight of a mineral binder of the present invention. The term "mineral binder composition" refers to a composition comprising a mineral binder.

The term "slag" refers to ground granulated blast furnace slag (GGBS), also called slag cement. Blast furnace slag is formed when iron ore, coke and limestone or dolomite are melted together in a blast furnace to produce iron. Blast furnace slag is a non-metallic coproduct produced in the process. It consists primarily of silicates, aluminosilicates and calcium-alumina-silicates. Granulated slag is rapidly cooled by large quantities of water to produce a sand-like granule in a glassy state, with little or no crystallization. The granulated slag is ground into GGBS. Slag is a latent hydraulic binder.

The term "latent hydraulic binder" refers to a mineral binder that reacts with water to solid hydrates when activated by additives.

The term "activator" refers to an additive able to activate the hydration of slag.

The term "co-activator" refers to an additive that is able to reduce the setting time and/or accelerates the hardening reaction of an activated slag.

The mineral binder preferably comprises at least 36 weight-%, preferably at least 66 weight-%, more preferably at least 82 weight-%, especially at least 90 weight-%, slag.

Suitable further components of the mineral binder are, for example, Portland cement, fly ash, silica fume, natural pozzolans or burnt oil shale.

Preferably, the slag has a specific surface of 2,000 to 10,000 $cm^2/g$, more preferably 4,000 to 9,000 $cm^2/g$, especially 4'300 to 8,000 $cm^2/g$, measured by the Blaine method.

Of special advantage is a slag with a specific surface in the range of 4'400 to 6,000 cm$^2$/g.

To adapt the specific surface of the slag, it may be of advantage to blend slags with different specific surfaces.

Slags with such a fineness are especially suited with respect to good workability at low water content and fast strength development of the mineral binder composition after mixing with water.

Preferably, the mineral binder is a blended cement comprising Portland cement and slag.

Suitable blended cements are for instance cements defined in DIN EN 197-1 as OEM IIIA, OEM IIIB, OEM IIIC and CEMV/B or in ASTM C595 as Type IS, Portland blast furnace slag cement.

In another preferred embodiment of the present invention, the mineral binder consists of slag. In this case, the only mineral binder in the mineral binder composition is slag. This is especially environmental friendly.

Preferably, the activator comprises 50 to 100 weight-% calcium hydroxide. Preferred other components of the activator may be further earth alkali hydroxides or alkali hydroxides, preferably sodium hydroxide, lithium hydroxide or potassium hydroxide.

Most preferred, the activator consists of calcium hydroxide.

Preferably, the activator is present in 0.3 to 4 weight-%, more preferably 0.4 to 3.5 weight-%, even more preferably 0.5 to 3 weight-%, especially 0.6 to 2.5 weight-%, based on the weight of the mineral binder.

A dosage below 0.3 weight-% might be insufficient to effectively activate the slag and a dosage above 4 weight-% might be negative on the workability of the mineral binder composition.

A co-activator is used to further improve the performance of the mineral binder composition.

Surprisingly, the co-activator not only reduces the initial setting time but also increases the speed of the hydration reaction.

Preferably, the co-activator comprises lithium carbonate and/or sodium carbonate, more preferably lithium carbonate.

It can also be of advantage, if the co-activator consists of lithium carbonate and/or sodium carbonate, preferably lithium carbonate.

Preferably, the co-activator is present in 0.1 to 3 weight-%, more preferably 0.12 to 2 weight-%, even more preferably 0.14 to 1 weight-%, especially 0.16 to 0.8 weight-%, with respect to the weight of the mineral binder.

Such a dosage of co-activator can reduce setting time and improve early age strength.

A dosage below 0.1 weight-% of the co-activator might not be sufficient to effectively reduce the setting time and/or to accelerate the hardening of the mineral binder, and a dosage above 3 weight-% may have negative effects on workability and costs.

Preferably, the weight-ratio of activator to co-activator is 20:1 to 1:1, more preferably 10:1 to 1.1:1.

Such a ratio is effective to accelerate the setting and/or hydration of the mineral binder as well as it keeps the costs low.

Preferably, the mineral binder composition further comprises 0.1 to 5 weight-%, more preferably 0.2 to 3 weight-%, especially 0.3 to 2 weight-%, calcium sulfate, preferably calcium sulfate hemihydrate, based on the weight of the mineral binder without calcium sulfate. This means that, as stated above, for the calculation of the weight-% of calcium sulfate relative to the weight of the mineral binder, calcium sulfate itself is not considered for the weight calculation of the mineral binder.

The calcium sulfate is able to improve the rheological properties as well the strength development of the mineral binder.

Preferably, the mineral binder composition further comprises a superplasticizer. Preferably, the superplasticizer comprises an anionic comb-polymer comprising polyalkylene glycol side chains.

The term "anionic comb-polymer comprising polyalkylene glycol side chains" refers to a polymer comprising anionic groups at the backbone of the polymer and side chains of polyalkylene glycol. The anionic groups are preferably selected from the group consisting of carboxylate groups, sulfonate groups, sulfate groups, phosphate groups and phosphonate groups. The side chains are preferably bound via ester, ether, imide and/or amide groups to the polymer backbone.

The polyalkylene glycol side chains are preferably composed of ethylene glycol or propylene glycol or ethylene- and propylene glycol. Most preferred are side chains of polyethylene glycol.

Preferably, the comb-polymer comprises structural units of formula I

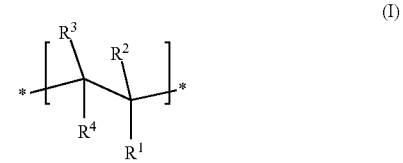

and structural units of formula II,

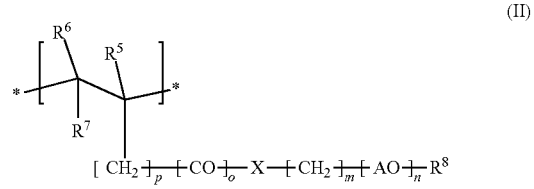

where
$R^1$, in each case independently of any other, is —COOM, —SO$_2$-OM, —O—PO(OM)$_2$ and/or —PO(OM)$_2$,
$R^2$ and $R^5$, in each case independently of any other, are H, —CH$_2$—COOM or an alkyl group having 1 to 5 carbon atoms,
$R^3$ and $R^6$, in each case independently of any other, are H or an alkyl group having 1 to 5 carbon atoms,
$R^4$ and $R^7$, in each case independently of any other, are H, —COOM or an alkyl group having 1 to 5 carbon atoms,
or where $R^1$ and $R^4$ form a ring to —CO—O—CO— (anhydride), M, in each case independently of any other, is H$^+$, an alkali metal ion, an earth alkali metal ion, a di- or trivalent metal ion, an ammonium ion or an organic ammonium group,
p=0, 1 or 2,
o=0 or 1,
m=0, or a number from 1 to 4,
n=2-250, more particularly 10-200, X, in each case independently of any other, is —O— or —NH—, $R^8$, in each case independently of any other, is H, a $C_1$- to $C_{20}$-alkyl group, -cyclohexylgroup or alkylarylgroup, and A=$C_2$- to $C_4$-alkylene.

Preferably, the molar ratio of structural unit I to structural unit II is 0.7-10:1, more preferred 1-8:1, particularly 1.5-5:1.

It may be of advantage, if the comb-polymer comprises further structural units III. Preferred structural units III are derived from monomers selected from the group comprising acrylic or methacrylic alkyl esters, acrylic or methacrylic hydroxyalkyl esters, vinylacetate, styrene or N-vinylpyrrolidone.

Preferably, the anionic comb-polymer comprises carboxylic acid and/or salt groups and polyethylene glycol side chains.

Such polymers are very effective dispersants for the mineral binder composition when mixed with water and especially suited for the mineral binder composition of the present invention.

It may be of advantage, if the superplasticizer comprises more than one anionic comb-polymer comprising polyalkylene glycol side chains. A combination of different comb-polymers differing, for example, in type or amount of anionic groups, length or number of the side chains or additional monomer units, may help to trigger the performance of the mineral binder composition with respect to workability, time of workability and water demand.

The mass averaged molecular weight (Mw) of the anionic comb-polymer comprising polyalkylene glycol side chains, measured with SEC against polyethylene glycol standards with water comprising 0.067 M $Na_2HPO_4$ and 0.01 M $NaN_3$ as eluent, is preferably 5,000 to 200,000 g/mol, more preferred 8,000 to 150,000 g/mol, especially preferred 10,000 to 130,000 g/mol, particularly 12,000 to 80,000 g/mol.

Preferably, the superplasticizers is a powder.

Preferably, the superplasticizer is present in 0.02 to 4 weight-%, preferably 0.05 to 2 weight-%, more preferably 0.08 to 1 weight-%, especially 0.1 to 0.5 weight-%, calculated as dry material on the weight of the mineral binder.

Preferably, the mineral binder composition further comprises a viscosity-enhancing agent, preferably a polysaccharide, more preferably a microbial polysaccharide, particularly selected from the group consisting of welan gum, xanthan gum, diutan gum and gellan gum, preferably diutan gum.

Such gums are water soluble, compatible with many chemicals that may be part of the mineral binder composition and do not influence the setting of the mineral binder in an undesired way. They are very effective to prevent sedimentation or bleeding of the mineral binder composition after mixing with water.

Preferably, the viscosity-enhancing agent is present in 0.006 to 0.5 weight-% based on the weight of the mineral binder.

If the viscosity-enhancing agent is a microbial polysaccharide, it is preferably present in 0.006 to 0.1 weight-%, more preferred in 0.01 to 0.05 weight-%, based on the weight of the mineral binder.

Preferably, the mineral binder composition comprises further additives like defoamers, surfactants, colouring agents, biocides, retarders, air entraining agents, rheology improving agents, thickeners, shrinkage reducers or corrosion inhibitors.

In a preferred mineral binder composition the activator is calcium hydroxide and is present in 0.3 to 4 weight-%, preferably 0.4 to 3.5 weight-%, more preferably 0.5 to 3 weight-%, especially 0.6 to 2.5 weight-%, the co-activator is lithium carbonate and/or sodium carbonate and is present in 0.1 to 3.0 weight-%, preferably 0.12 to 2 weight-%, more preferably 0.14 to 1 weight-%, and the mineral binder composition further comprises 0 to 4 weight-%, preferably 0.05 to 2 weight-%, more preferably 0.08 to 1 weight-%, especially 0.1 to 0.5 weight-%, of at least one superplasticizer, preferably comprising an anionic comb-polymer comprising polyalkylene glycol side chains, 0 to 5 weight-%, preferably 0.2 to 3 weight-%, more preferably 0.3 to 2 weight-%, calcium sulfate 0.006 to 0.5 weight-%, of a viscosity-enhancing agent, preferably a polysaccharide, and 0 to 3 weight-% further additives, wherein all weight-% are based on the weight of the mineral binder.

Preferably, the mineral binder composition further comprises inert mineral fillers. Mineral fillers are chemically inert solid materials available in various shapes, sizes or of differing material, from finest sand particles to coarse gravel. Suitable are basically all fillers typically used in mortar or concrete.

Preferably, the mineral binder composition is a mortar or a concrete.

All components of the mineral binder composition can be mixed as solid materials to produce a solid mineral binder composition which may be stored until it is mixed with water.

It may be of advantage, if parts of the mineral binder composition are mixed in a pre-mix, which may be packed and stored for hours, months or years before mixed with the other components.

Preferably, a pre-mix can be produce by mixing activator, co-activator and optional calcium sulfate, superplasticizer and/or viscosity-enhancing agent.

A further aspect of the invention is the use of a composition comprising, based on the weight of the composition, 5 to 95 weight-% calcium hydroxide, 5 to 60 weight-% lithium carbonate, lithium sulfate and/or sodium carbonate, preferably lithium carbonate and/or sodium carbonate, 0 to 40 weight-%, preferably 1 to 30 weight-%, calcium sulfate, 0 to 35 weight-%, preferably 5 to 30 weight-%, superplasticizer, preferably an anionic comb-polymer comprising polyalkylene glycol side chains, 0 to 20 weight-%, preferably 0.2 to 10 weight-%, viscosity-enhancing agent, and 0 to 20 weight-% further additives to accelerate the setting and/or hardening of mineral binders comprising at least 30 weight-% slag, based on the weight of the mineral binder.

The mineral binder composition of the present invention hardens when mixed with water. Preferably, the weight ratio of water to mineral binder in the aqueous mineral binder composition is 0.22 to 0.7, more preferable 0.25 to 0.5, even more preferable 0.3 to 0.4. Such a water content results in improved strength of the hardened body.

A further aspect of the invention is a hardened body, especially a part of a construction, obtained after hardening of the mineral binder composition as described bevor, after mixing with water.

A construction can be, for example, a bridge, a building, a tunnel, a roadway or a runway.

EXAMPLES

The following examples, without being limitative, illustrate the present invention.

1. Materials

Ecocem is a ground granulated blast furnace slag (GGBFS), with a density of about 2,900 kg/m$^3$, a mean particle size (D50) of 11 µm and a Blaine specific surface of about 4,500 cm$^2$/g, available from Ecocem Materials Ltd., Ireland. Ecocem Superfine is a finer ground GGBFS, with a density of about 2'900 kg/m$^3$, a mean particle size (D50) of 5 µm and a Blaine specific surface of 7,000-8,000 cm$^2$/g, available from Ecocem Materials Ltd., Ireland.

OEM III/A is OEM III/A 32.5 N-LH, a blended cement according to DIN EN 197-1, available from HeidelbergCement AG, Germany.

Calcium hydroxide was Nekapur® 2, available from Kalkfabrik Netstal AG, Switzerland.

Lithium carbonate and lithium sulfate were purchased from Sigma-Aldrich Chemie GmbH, Switzerland.

Sodium carbonate was Emsure®, purchased from Merck KGaA, Germany.

Calcium sulfate was calcium sulfate hemihydrate (CaSO$_4$·½H$_2$O), available from Knauf AG, Germany.

Sika® ViscoCrete®-125P is a superplasticizer powder based on an anionic comb-polymer comprising polyalkylene glycol side chains, available from Sika, Switzerland.

Ligninsulfonate is a commercial Na-ligninsulfonate powder.

Kelco-crete® DG-F is diutan gum, available from CP Kelco, USA.

2. Application Tests

Mineral binder compositions were produced and mixed with water and their performance was tested. The mineral binder compositions were fine mortars with maximum aggregate size of 0.3 mm.

2.1 Measuring Methods

The setting time of the mortar was measured with the automated Vicat apparatus Vicatronic according to EN 196-3.

The compressive strength of the mortar was measured on prisms of 40×40×160 mm size. The specimens were produced immediately after mixing by filling the moulds with the mortar and smoothing the surface with a trowel. The moulds were stored at 20° C. A series of prisms was produced and the prisms were demoulded and tested at predefined time intervals. The strength of the prisms was measured according to EN 196-1.

2.2. Production of the Dry Mineral Binder, Mixing with Water and Performance of the Product All components of the mineral binder composition were mixed in the dry state in a mechanical mixer (KitchenAid Model Artisan, 5KSM150) at speed 1 for 30 seconds in the amount given in table 1 to table 4.

Next water was added and the mass was mixed at speed 2 for 30 seconds. The mixing was stopped; the mass was homogenized manually and then mixed again at speed 4 for 2 additional minutes.

Table 1 shows the composition of the mortars M1 to M7, activated with Ca(OH)$_2$, and the effect of lithium carbonate and calcium sulfate on setting time and compressive strength after 10 and 24 hours. The weight-ratio of water to slag was 0.36.

TABLE 1

| Component | M1* | M2 | M3 | M4 | M5 | M6* | M7 |
|---|---|---|---|---|---|---|---|
| Ecocem [g] | 200 | 200 | 200 | 200 | 200 | 200 | 200 |
| Ecocem Superfine [g] | 50 | 50 | 50 | 50 | 50 | 50 | 50 |
| Ca(OH)$_2$ [g] | 5 | 5 | 5 | 5 | 2.5 | 1.5 | 1.5 |
| Li$_2$CO$_3$ [g] | 0 | 0.5 | 1 | 0.5 | 0.5 | 0 | 0.5 |
| Sika® ViscoCrete®-125P [g] | 0.5 | 0.5 | 0.5 | 0.5 | 0.5 | 0.5 | 0.5 |
| Kelco-crete® D-GF [g] | 0.03 | 0.03 | 0.03 | 0.03 | 0.03 | 0.03 | 0.03 |
| Calcium sulfate [g] | 0 | 0 | 0 | 1.0 | 0 | 0 | 0 |
| Quartz sand 0.06-0.3 mm [g] | 250 | 250 | 250 | 250 | 250 | 250 | 250 |
| Properties of the mortar after mixing with 90 g water | | | | | | | |
| Initial set [h] | 6.3 | 5.5 | 3.6 | 7.3 | 5.3 | 8.6 | 6.2 |
| Final set [h] | 10.4 | 9.1 | 5.8 | 8.6 | 8.4 | 13.9 | 10.1 |
| 10 hours strength [MPa] | <1 | 1.3 | 6.6 | 1.8 | 1.5 | <1 | 1 |
| 24 hours strength [MPa] | 10.6 | 12.8 | 19.2 | 16.9 | 13.4 | 7.4 | 10.5 |

*Reference

Table 2 shows the composition of the mortars M8 to M10, activated with Ca(OH)$_2$, and the effect of sodium carbonate on setting time and compressive strength after 10 and 24 hours. The weight-ratio of water to slag was 0.36.

TABLE 2

| Component | M8 | M9 | M10 |
|---|---|---|---|
| Ecocem [g] | 200 | 200 | 200 |
| Ecocem Superfine [g] | 50 | 50 | 50 |
| Ca(OH)$_2$ [g] | 5 | 5 | 5 |
| Na$_2$CO$_3$ [g] | 0.5 | 1 | 1.5 |
| Sika® ViscoCrete® -125P [g] | 0.5 | 0.5 | 0.5 |
| Kelco-crete® D-GF [g] | 0.03 | 0.03 | 0.03 |
| Quartz sand 0.06-0.3 mm [g] | 250 | 250 | 250 |
| Properties of the mortar after mixing with 90 g water | | | |
| Initial set [h] | 5.7 | 4.1 | 3.9 |
| Final set [h] | 9.4 | 6.8 | 6.3 |
| 10 hours strength [MPa] | 1.2 | 3.7 | 5.4 |
| 24 hours strength [MPa] | 12.6 | 18.0 | 18.9 |

Table 3 shows the composition of the mortars M11 to M16, activated with Ca(OH)$_2$, and the effect of lithium carbonate on setting time and compressive strength after 10 hours. The weight-ratio of water to cement was 0.36.

TABLE 3

| Component | M11* | M12 | M13 | M14 | M15 | M16 |
|---|---|---|---|---|---|---|
| Cement CEM III/A [g] | 250 | 250 | 250 | 250 | 250 | 250 |
| Ca(OH)$_2$ [g] | 2 | 2 | 2 | 2 | 5 | 5 |
| Li$_2$CO$_3$ [g] | 0 | 1.2 | 1.4 | 1.7 | 1 | 1.5 |
| Sika® ViscoCrete®-125P [g] | 0.5 | 0.5 | 0.5 | 0.5 | 0.5 | 0.5 |
| Kelco-crete® D-GF [g] | 0.03 | 0.03 | 0.03 | 0.03 | 0.03 | 0.03 |
| Quartz sand 0.06-0.3 mm [g] | 250 | 250 | 250 | 250 | 250 | 250 |
| Properties of the mortar after mixing with 95 g water | | | | | | |
| Initial set [h] | 7.5 | 4.0 | 1.9 | 1.7 | 2.3 | 3 |
| 10 hours strength [MPa] | <1 | 1.1 | 3.6 | 5.5 | n.m. | 6 |

TABLE 3-continued

*Reference
n.m.: not measured

Table 4 shows the composition of the mortars M17 to M19 and the effect of superplasticizers on the water demand of the composition to gain a fluid consistency.

TABLE 4

| Component | M17 | M18 | M19 |
|---|---|---|---|
| Ecocem [g] | 200 | 200 | 200 |
| Ecocem Superfine [g] | 50 | 50 | 50 |
| Ca(OH)$_2$ [g] | 2.5 | 2.5 | 2.5 |
| Li$_2$CO$_3$ [g] | 1.5 | 1.5 | 1.5 |
| Ligninsulfonate [g] | 0 | 0.8 | 0 |
| Sika ® ViscoCrete ® -125P [g] | 0 | 0 | 0.5 |
| Kelco-crete ® D-GF [g] | 0.03 | 0.03 | 0.03 |
| Quartz sand 0.06-0.3 mm [g] | 250 | 250 | 250 |
| Necessary addition of water [g] to get fluid consistency | 110 | 100 | 90 |

The invention claimed is:

1. A mineral binder composition comprising:
   a mineral binder comprising 36-65 weight-% of slag and 35-64 weight-% of Portland cement, based on the weight of the mineral binder,
   an activator for the hydration of the slag comprising calcium hydroxide and
   a co-activator comprising at least one salt selected from the group consisting of lithium carbonate, lithium sulfate and sodium carbonate,
   wherein the activator is present in an amount in a range of 0.5-3.0 weight-% based on the weight of the mineral binder,
   wherein the co-activator is present in an amount in a range of 0.16-0.8 weight-% based on the weight of the mineral binder, and
   wherein a weight-ratio of activator to co-activator is 10:1 to 1.1:1.

2. The mineral binder composition according to claim 1, wherein the slag has a specific surface of 4,400 to 6,000 cm$^2$/g, measured by the Blaine method.

3. The mineral binder composition according to claim 1, wherein the co-activator comprises lithium carbonate and/or sodium carbonate.

4. The mineral binder composition according to claim 1, wherein the co-activator consists of lithium carbonate and/or sodium carbonate.

5. The mineral binder composition according to claim 1, further comprising 0.1 to 5 weight-%, calcium sulfate, based on the weight of the mineral binder without calcium sulfate.

6. The mineral binder composition according to claim 1, further comprising a superplasticizer.

7. The mineral binder composition according to claim 1, wherein
   the activator is calcium hydroxide
   the co-activator is lithium carbonate and/or sodium carbonate and the mineral binder composition further comprises,
   0 to 4 weight-% of at least one superplasticizer,
   0 to 5 weight-% calcium sulfate,
   0.006 to 0.5 weight-% of a viscosity-enhancing agent, and
   0 to 3 weight-% further additives,
   wherein all weight-% are based on the weight of the mineral binder.

8. A method for accelerating setting and/or hardening of the mineral binder of claim 1, comprising adding a composition comprising, based on the weight of the composition,
   5 to 95 weight-% calcium hydroxide,
   5 to 60 weight-% lithium carbonate, lithium sulfate or sodium carbonate,
   0 to 40 weight-% calcium sulfate,
   0 to 35 weight-% superplasticizer,
   0 to 20 weight-% viscosity-enhancing agent, and
   0 to 20 weight-% further additives
   to the mineral binder.

9. A hardened body obtained after hardening of the mineral binder composition according to claim 1 after mixing with water.

* * * * *